United States Patent
Ortega (10) Patent No.: US 9,145,656 B2
(45) Date of Patent: Sep. 29, 2015

(54) CONFIGURABLE SEAT ASSEMBLY FOR WORK VEHICLES

(71) Applicant: Deere & Company, Moline, IL (US)

(72) Inventor: Daniel Ortega, Romeoville, IL (US)

(73) Assignee: DEERE & COMPANY, Moline, IL (US)

( * ) Notice: Subject to any disclaimer, the term of this patent is extended or adjusted under 35 U.S.C. 154(b) by 1 day.

(21) Appl. No.: 14/156,166

(22) Filed: Jan. 15, 2014

(65) Prior Publication Data

US 2015/0197919 A1  Jul. 16, 2015

(51) Int. Cl.
*B60N 2/38* (2006.01)
*E02F 9/16* (2006.01)
*B60N 2/20* (2006.01)

(52) U.S. Cl.
CPC ............... *E02F 9/166* (2013.01); *B60N 2/203* (2013.01); *B60N 2/38* (2013.01)

(58) Field of Classification Search
CPC .................................. B60N 2/38; B60N 2/203
USPC .................. 297/1, 3, 92, 283.1, 283.2, 283.3
See application file for complete search history.

(56) References Cited

U.S. PATENT DOCUMENTS

| | | | | |
|---|---|---|---|---|
| 2,784,768 A | * | 3/1957 | Holopainen | 297/93 |
| 2,946,373 A | * | 7/1960 | McCanse et al. | 248/421 |
| 3,243,228 A | * | 3/1966 | Watts et al. | 297/92 |
| 3,246,926 A | * | 4/1966 | Link | 297/93 |
| 3,412,968 A | * | 11/1968 | Rose et al. | 248/425 |
| 3,893,728 A | * | 7/1975 | Holopainen | 296/65.07 |
| 4,005,845 A | * | 2/1977 | Luppi et al. | 248/419 |
| 4,010,977 A | * | 3/1977 | Rahman | 297/92 |
| 4,072,343 A | * | 2/1978 | Meza | 297/93 |
| 4,134,617 A | * | 1/1979 | Matsubara | 297/344.15 |
| 4,252,368 A | * | 2/1981 | Miller et al. | 297/235 |
| 4,749,191 A | * | 6/1988 | Gipson et al. | 280/164.2 |
| 5,098,154 A | * | 3/1992 | Emery | 297/92 |
| 5,127,699 A | * | 7/1992 | Maezawa et al. | 296/65.02 |
| 6,711,839 B1 | * | 3/2004 | Kawamura et al. | 37/466 |
| 6,957,853 B2 | | 10/2005 | Williams et al. | |
| 2007/0108805 A1 | * | 5/2007 | Manning | 297/94 |

FOREIGN PATENT DOCUMENTS

EP  0123897 A2  11/1984

* cited by examiner

*Primary Examiner* — Rodney B White (57) ABSTRACT

The present disclosure relates to a configurable seat assembly for a vehicle, a vehicle having a configurable seat assembly, and a method of reconfiguring a configurable seat assembly. The configurable seat assembly can be configured between two work configurations and includes a detachable seat panel that can be moved out of the way of an operator when the operator is reconfiguring the configurable seat assembly and moving between the two work configurations.

18 Claims, 6 Drawing Sheets

CONFIGURABLE SEAT ASSEMBLY FOR WORK VEHICLES

FIELD OF THE DISCLOSURE

The present disclosure relates to a configurable seat assembly for work vehicles.

BACKGROUND OF THE DISCLOSURE

There are work vehicles having multiple work operation stations that require a reversible seat to allow an operator switch between the work operation stations or areas. Backhoe loaders are a type of work vehicle for performing two work operations and that have two work operation stations. The backhoe loader is provided with a front mounted loader and a rear mounted backhoe. The operator station or cab is provided with a reversible seat which faces to the front for transport and loading operations and to the back for backhoe operations.

SUMMARY OF THE DISCLOSURE

According to an aspect of the present disclosure, a configurable seat assembly for a vehicle includes a first mount configured to pivot about a first axis, a second mount configured to pivot about the first axis, a first seat panel connected to the first mount and second mount, the first seat panel pivotable about the first axis between a first seat assembly configuration in which the first seat panel is positioned as a seat back and a second seat assembly configuration in which the first seat panel is positioned as a seat bottom, and a second seat panel detachably connected to the second mount, the second seat panel pivotably connected to the first mount about a second axis that is at an angle relative to the first axis, the second seat panel pivotable about the first axis between the first seat assembly configuration in which the second seat panel is positioned as a seat bottom and the second seat assembly configuration in which the seat panel is positioned as a seat back, wherein the second seat panel is pivotable about the second axis when the second seat panel is detached from the second mount.

Another aspect of the present disclosure provides a vehicle including a a first work implement on a first side of the vehicle, a second work implement on a second side of the vehicle that is opposite to the first side, a first operator work area adjacent the first work implement, a second operator work area adjacent the second work implement, and a configurable seat assembly having a first seat assembly configuration in which the configurable seat assembly is positioned adjacent the first operator work area and a second seat assembly configuration in which the configurable seat assembly is positioned adjacent the second operator work area. The configurable seat assembly can include a first mount configured to pivot about a first axis that is substantially orthogonal to a first line extending between the first side and the second side, a second mount configured to pivot about the first axis, a first seat panel connected to the first mount and second mount, the first seat panel pivotable about the first axis between the first seat assembly configuration in which the first seat panel is positioned as a seat back and the second seat assembly configuration in which the first seat panel is positioned as a seat bottom, and a second seat panel detachably connected to the second mount, the second seat panel pivotably connected to the first mount about a second axis that is substantially parallel to the line extending between the first side and the second side, the second seat panel pivotable about the first axis between the first seat assembly configuration in which the second seat panel is positioned as a seat bottom and the second seat assembly configuration in which the seat panel is positioned as a seat back, wherein the second seat panel is pivotable about the second axis when the second seat panel is detached from the second mount.

Another aspect of the present disclosure provides a method for operating the configurable seat assembly to switch between the seat assembly configurations.

The above and other aspects of the present disclosure and examples will become apparent from the following description and the attached drawings.

BRIEF DESCRIPTION OF THE DRAWINGS

The detailed description of the drawings refer to the accompanying figures in which.

DETAILED DESCRIPTION OF THE DRAWINGS

Figure 1:
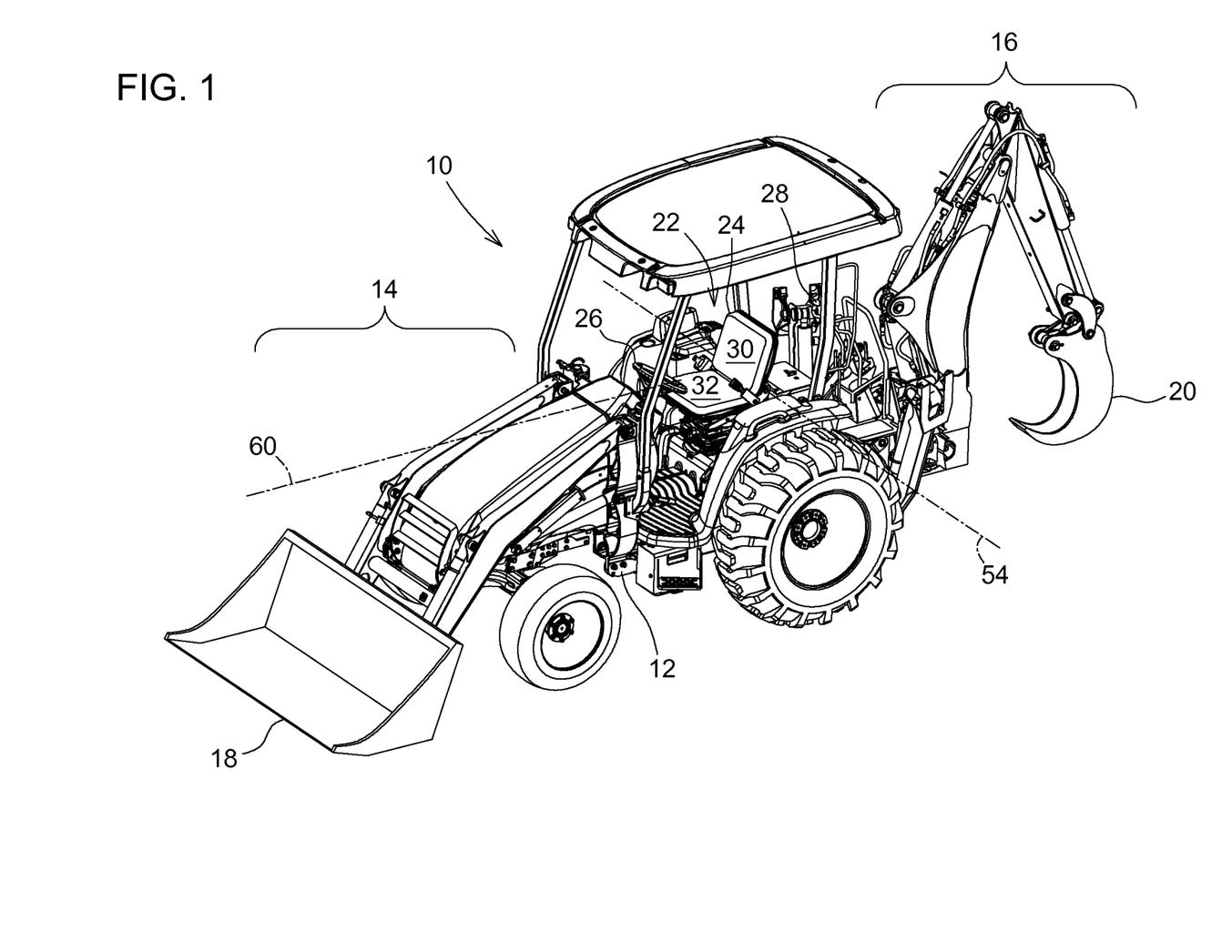
FIG. 1 is a front perspective view of an example work vehicle including an example configurable seat assembly in a front configuration.
Figure 2:
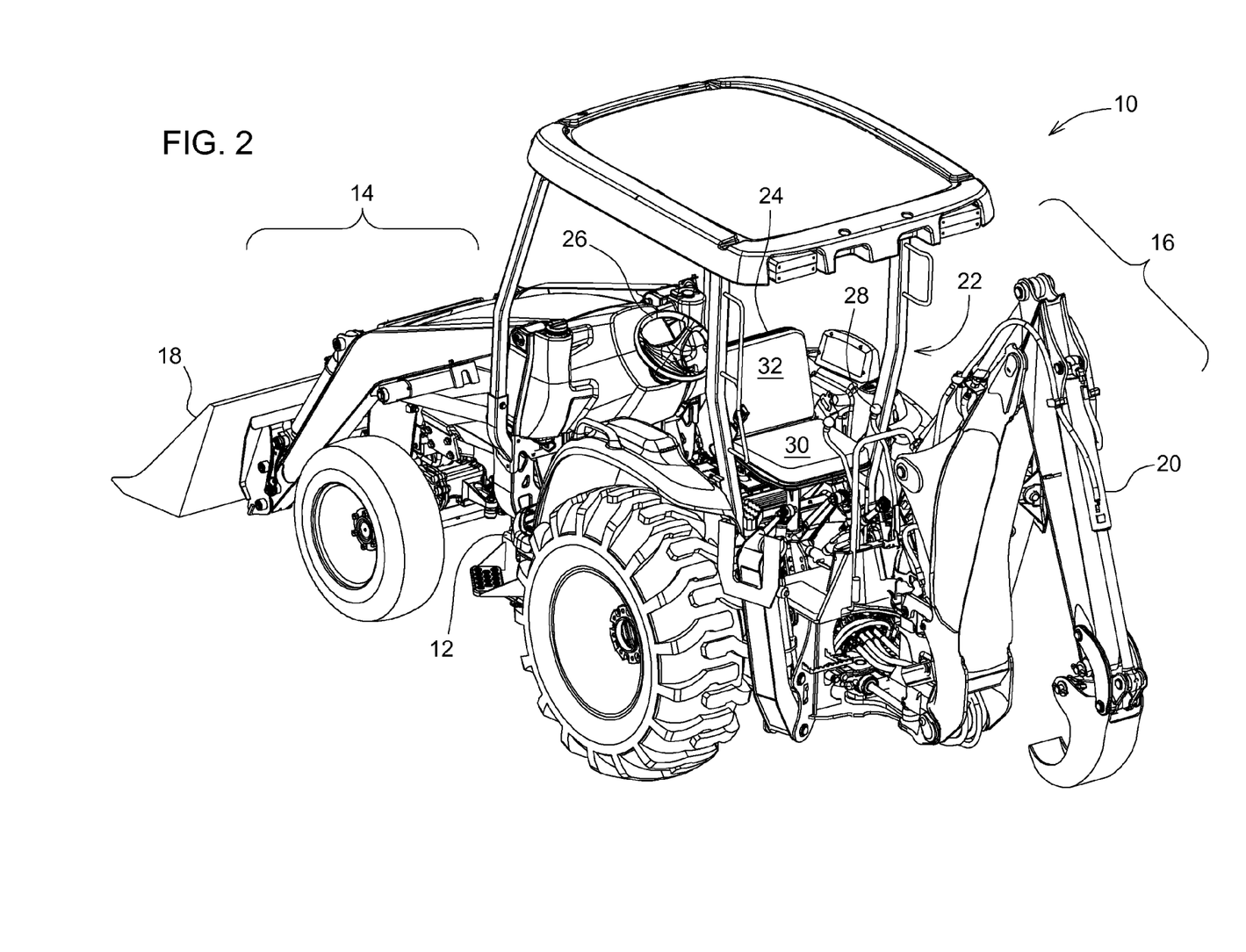
FIG. 2 is a rear perspective view of the work vehicle and configurable seat assembly of FIG. 1 where the configurable seat assembly is in a back configuration.

Referring to FIGS. 1 and 2, a work vehicle 10 is an example backhoe loader with a support structure 12 that has a front work end 14 and a back work end 16. On the front work end 14, a first work element 18 comprising a loader is mounted to the support structure 12. On the back work end 16, a second work element 20 comprising a backhoe is mounted to the support structure 12.

The operation of the work vehicle 10 and operation of the first and second work implements 18 and 20 are controlled from an operator's station 22. A configurable seat assembly 24 is mounted in operator's station 22. As will be described in more detail below, seat assembly 24 can be reconfigured to allow an operator to operate the front work end 14 or the back work end 16. Operator's station 22 includes at least one operator input 26 positioned towards the front work end 14. For example, the at least one operator input 26 may allow an operator to control the propel mode of the vehicle 10 and/or control the operation of the work implement 18. Operator's station 22 includes at least one operator input 28 positioned towards the back work end 16. For example, the at least one operator input 28 may allow an operator to control operation of the work implement 20.

In a front configuration shown in FIG. 1, the seat assembly 24 faces towards the front work end 14 to allow an operator to manipulate the at least one operator input 26 to operate the work implement 18. In a back configuration shown in FIG. 2, the seat assembly 24 faces towards the back work end 16 to allow an operator to manipulate the at least one operator input 28 to operate the work implement 20. As discussed below, the 24 seat assembly can be transitioned between the front and back configurations, or in other words, between the two operating configurations of the work vehicle.

Seat assembly 24 includes a first seat panel 30 and a second seat panel 32. In the front configuration shown in FIG. 1, the first seat panel 30 is in a seat back position and serves as a seat back for the operator and the second seat panel 32 is in a seat rest position and serves a seat rest (i.e., bottom seat) for the operator. In the back configuration shown in FIG. 2, the first seat panel 30 is in a seat rest position and serves as a seat bottom for the operator and the second seat panel 32 is in a seat back position serves as a seat back for the operator. To transition between the front and back configurations, the second seat panel 32 can be rotated out of the way in a transition configuration so that the operator doesn't have to step over the second seat panel 32 when switching between operating positions, as discussed below. Then both panels 30, 32 can be rotated together towards the back and then the second seat panel 32 can be rotated out of the transition configuration.

Figure 3:
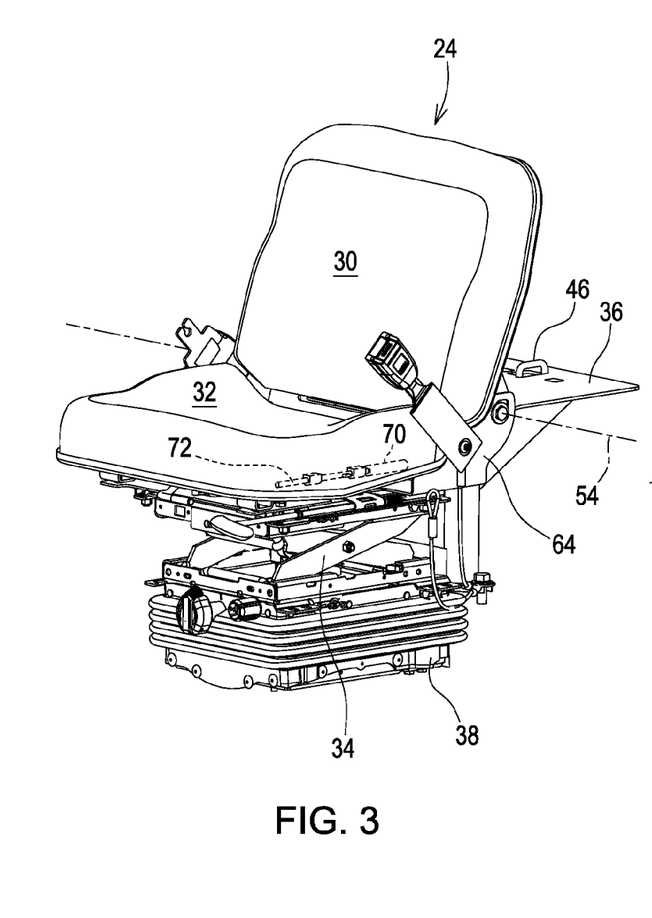
FIG. 3 is a front perspective view of an example configurable seat assembly of FIG. 1 in the front configuration.
Figure 8:
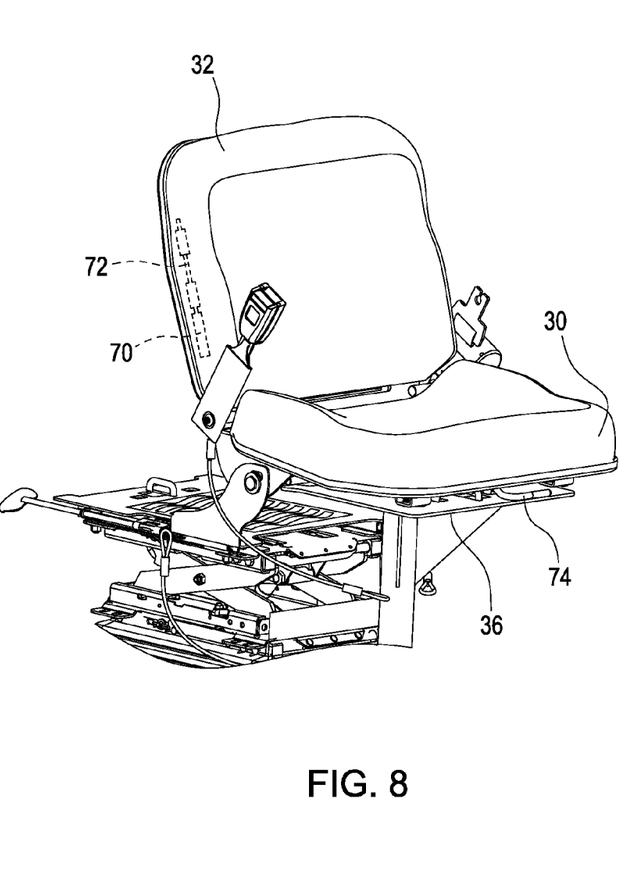
FIG. 8 is a rear perspective view of the example configurable seat assembly of FIG. 1 in a rear configuration.

Referring now to FIGS. 3-8, the seat assembly 24 can be transitioned between the front seat assembly configuration shown in FIG. 3 to the back seat assembly configuration shown in FIG. 8. FIGS. 4-7 show the example transition configurations of the seat assembly 24. Seat assembly 24 includes a front seat base 34 and a back seat base 36. Front seat base 34 has a bottom portion 38 that is attachable to a vehicle, or to a portion of an operator station of a vehicle, and a top portion 40 that includes a latch receiver 42 and a tread pattern 44. Back seat base 36 can extend via support arms from front seat base 34 or from a seat frame connected to the back seat base 36 and front seat base 34. Alternately, back seat base 36 may include a post connected to the vehicle (see FIG. 8). Back seat base 36 includes a latch receiver 46. Bottom portion 38 may have an active or passive suspension system as shown, may not include a suspension system, or may or may not be height adjustable. In alternate embodiments, back seat base 36 may include a suspension system and/or height adjustment mechanism. Tread pattern 44 provides for a step upon which an operator may step when switching between seat assembly configurations. Tread pattern 44 may have any pattern suitable for providing an operator step.

Seat assembly 24 includes a first mount 48 that has a first mounting arm 50 and a first bracket 52. The first mounting arm 50 is connected, or mounted, to the front seat base 34 or to the frame of the seat assembly 24. The first bracket 52 is pivotably connected to first mounting arm 50 about a first axis 54. The first bracket 52 includes a first bracket finger 56, which includes a hinge 58. The first bracket 52 is fixedly connected to the first seat panel 30. The second seat panel 32 is pivotably connected to the first bracket finger 56 through the hinge 58 about a second axis 60, which allows for the seat panel 32 to be rotated out of the way of the operator, as shown in FIGS. 4-7. First axis 54 is substantially orthogonal to second axis 60. As shown in FIG. 1, when seat assembly 24 is installed in vehicle 10, the first axis 54 generally lies along a line extending between sides of the vehicle 10 and second axis 60 generally lies along a line extending between front work end 14 and back word end 16. Each or both axis 54 and 60 may be aligned at a suitable angle with these lines when installed on a vehicle.

Seat assembly 24 includes a second mount 62 that has a second mounting arm 64 and a second bracket 66. The second mounting arm 64 is connected, or mounted, to the front seat base 34 or to the frame of seat assembly 24. The second bracket 66 is pivotably connected to the second mounting arm 66 about the first axis 54. The second bracket 66 includes a second bracket finger 68, which includes a locking pin receptor 70. The second bracket 66 is connected to the first seat panel 30. The second seat panel 32 includes a locking pin 72 which can engage the locking pin receptor 70 to detachably connect the seat panel 32 to the second bracket 66. FIGS. 3 and 8 show the locking pin 72 engaged in the locking pin receptor 70 to secure the second seat panel 32 to the second mount 62. FIGS. 4-7 show the locking pin 72 disengaged from the locking pin receptor 70 and disconnected from second mount 62 thereby allowing the second seat panel 32 to be able to pivot about axis 60.

Figure 6:
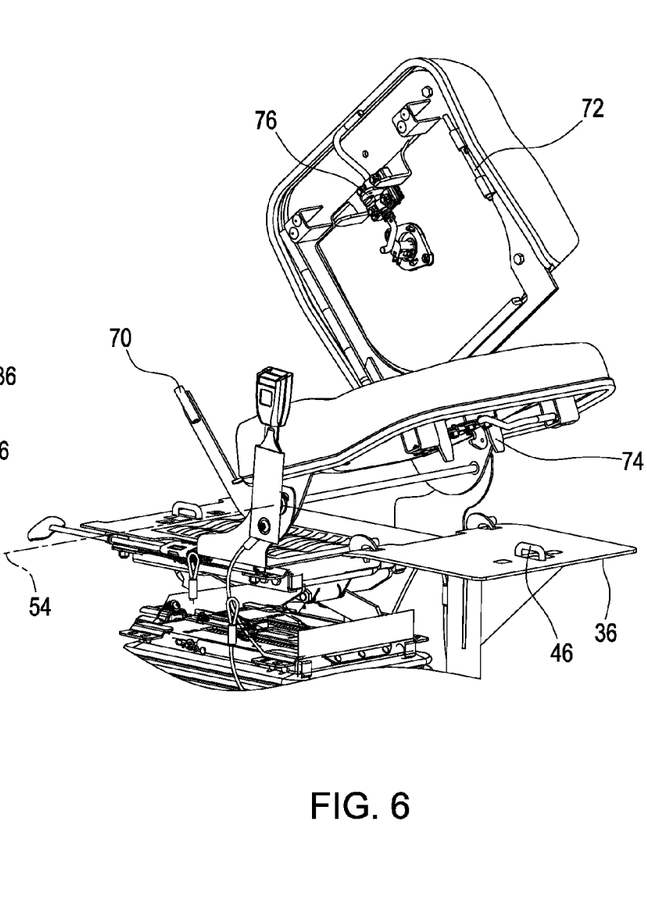
FIG. 6, is a rear perspective view of the example configurable seat assembly of FIG. 1 in the transition configuration shown in FIG. 5.
Figure 7:
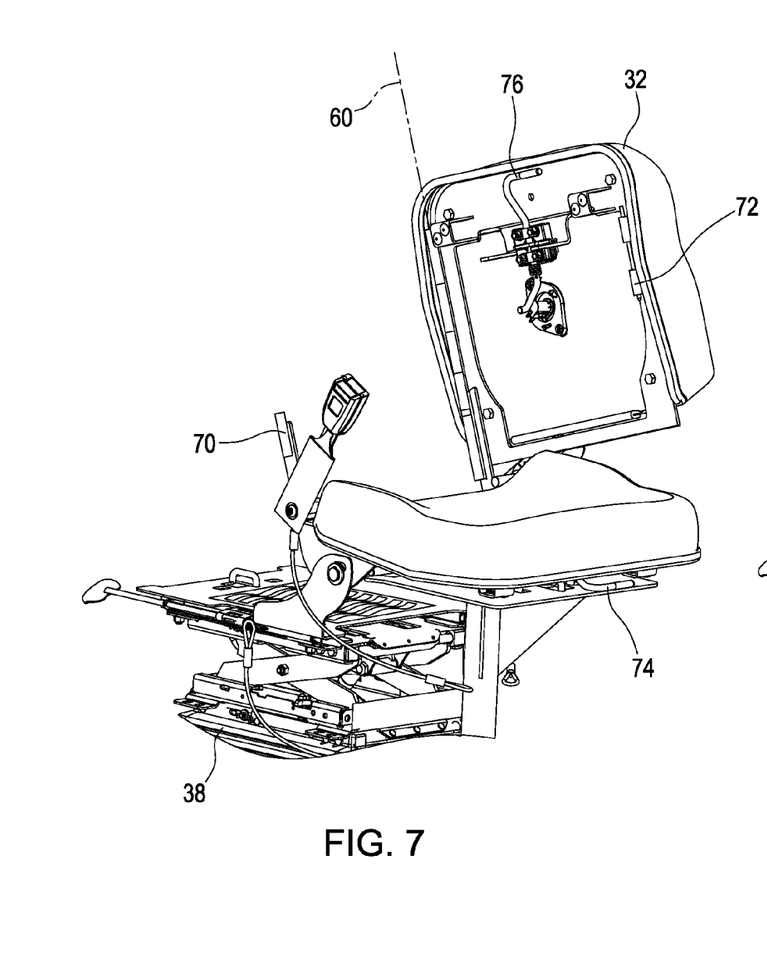
FIG. 7, is a rear perspective view of the example configurable seat assembly of FIG. 1 in a further transition configuration.

As shown in FIG. 6, seat panel 30 has a latching mechanism 74 on an opposite side to the side upon which the operator may sit in the back configuration shown in FIG. 8. Latching mechanism 74 detachably connects to latch receiver 46 of back seat base 36, which allows for seat panel 30 to connect to seat base 36 in the back configuration. Seat panel 30 can be disconnected from seat base 36 by operating the latching mechanism 74 to detach from the latch receiver 46.

Figure 4:
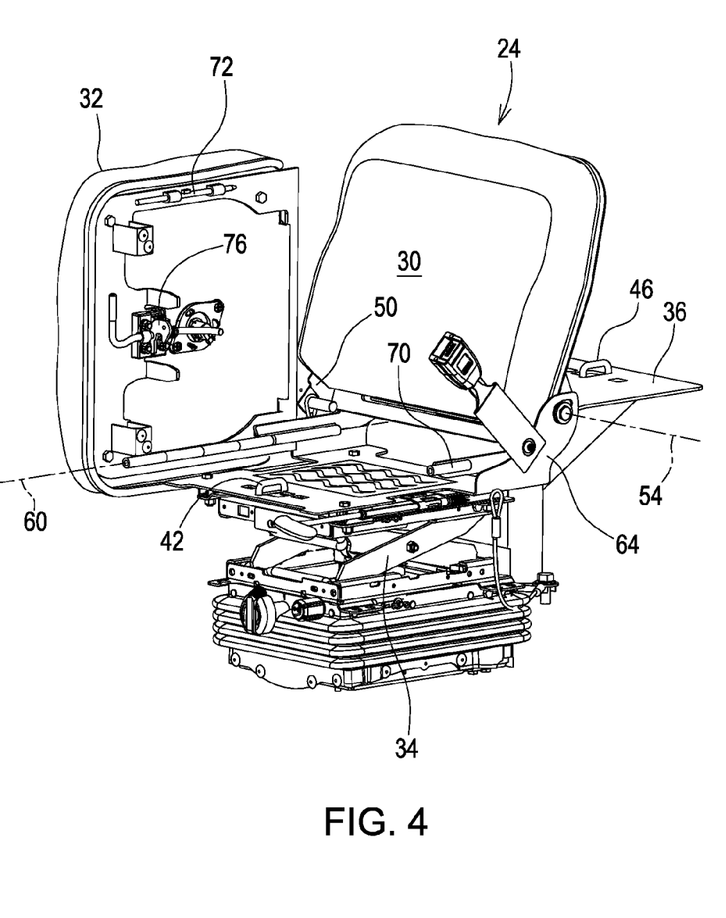
FIG. 4 is a front perspective view of the example configurable seat assembly of FIG. 1 in a transition configuration.
Figure 5:
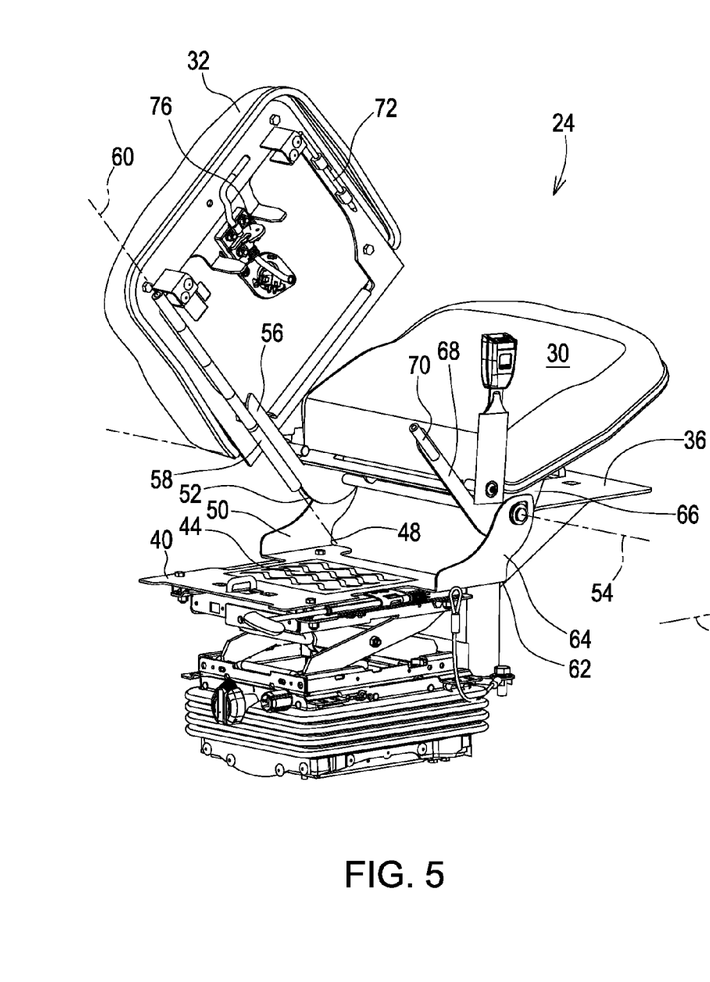
FIG. 5, is a front perspective view of the example configurable seat assembly of FIG. 1 in a transition configuration.

As is shown in FIG. 4, seat panel 32 has a latching mechanism 76 on an opposite side to the side upon which the operator may sit in the front configuration shown in FIG. 3. Latching mechanism 76 detachably connects to latch receiver 42 of front seat base 40, which allows for seat panel 32 to connect to seat base 40 in the front configuration. Seat panel 32 can be disconnected from seat base 40 by operating the latch mechanism 76 to detach from the latch receiver 42. In an embodiment, latching mechanism 76 can be integrated with locking pin 72 such that both are operated by a single operation by an operator. For example, operating latch mechanism 76 to detach from latch receiver 42 can also cause locking pin 72 to decouple from the locking pin receptor 70. In alternate embodiments, the latching mechanisms and locking pin may be positioned in other positions than the ones illustrated in the FIGS.

Figure 9:
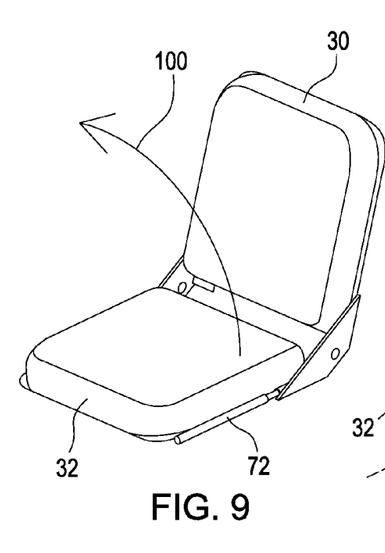
FIG. 9 is a front perspective view of an example configurable seat assembly in a front configuration.
Figure 10:
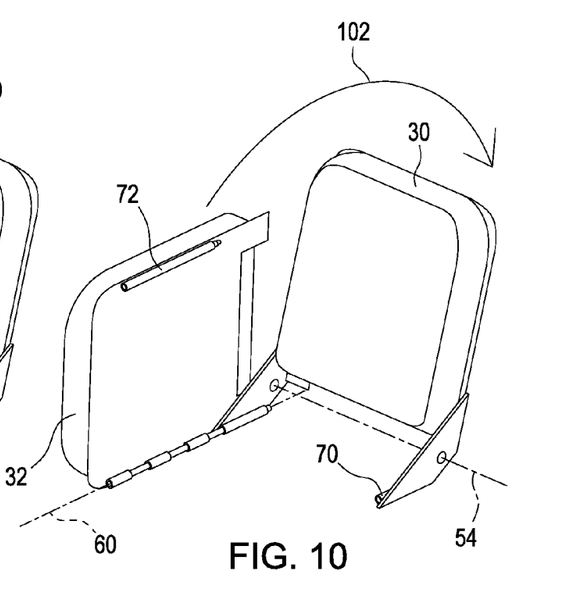
FIG. 10 is a front perspective view of the example configurable seat assembly of FIG. 9 in a transition configuration.
Figure 11:
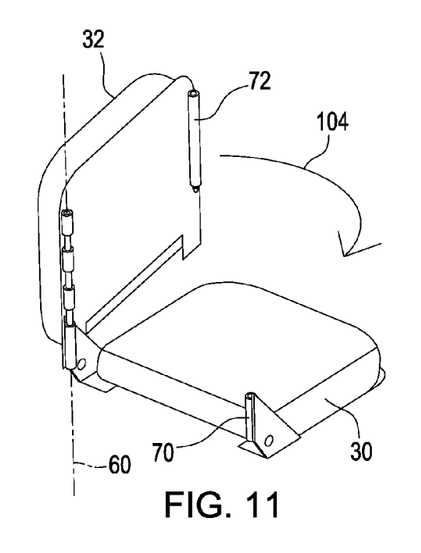
FIG. 11 is a front perspective view of the example configurable seat assembly of FIG. 9 in a further transition configuration.
Figure 12:
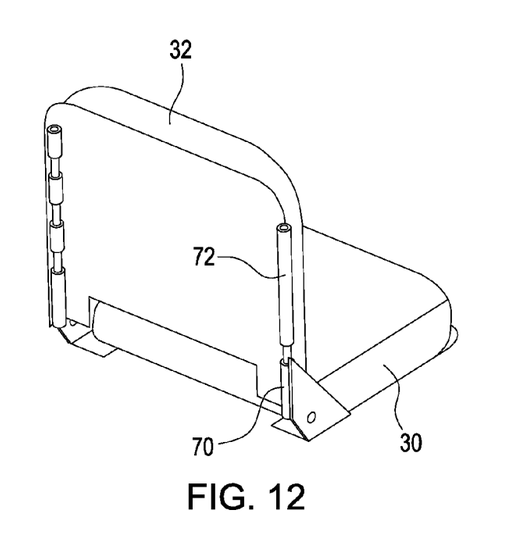
FIG. 12 is a front perspective view of the configurable seat assembly of FIG. 9 in a rear configuration.

The present disclosure provides a method for switching between configurations of a configurable seat assembly. Simplified views of the seat assembly 24 are used in FIGS. 9-12 to aid in the description of the method. Beginning in the front configuration shown in FIG. 9 where seat panel 32 serves as a seat bottom and seat panel 30 serves as a seat back for an operator, seat panel 32 is pivoted about the axis 60 in step 100. After step 100, seat panel 32 is in the transition configuration shown in FIGS. 10 and 11. In step 102, seat panels 30 and 32 are pivoted together about the axis 54 from the position shown in FIG. 10 to the position shown in FIG. 11. In FIG. 11, the seat panel 30 is positioned to serve as a seat bottom for an operator. In step 104, seat panel 32 is pivoted from the transition configuration shown in FIG. 10 to the back configuration shown in FIG. 12 so that the seat panel 32 serves as a seat back for the operator. The steps may be reversed to switch between the back configuration shown in FIG. 12 to the front configuration shown in FIG. 9.

The method will now be described with reference to FIGS. 3-8. Beginning in the front configuration shown in FIG. 3, the latching mechanism 76 and the locking pin 72 are operated to detach seat panel 32 from front seat base 40 and second backet 66, respectively. Then seat panel 32 can be pivoted about the axis 60 away from seat base 40 to the transition configuration shown in FIG. 4. Then seat panels 30 and 32 can be pivoted about the axis 54 until latching mechanism 76 engages latch receiver 42 in the transition configuration shown in FIG. 7. An operator may step on tread pattern 44 and over, or on, seat panel 30. Seat panel 32 can then be pivoted about axis 60 until locking pin 72 engages pin receptor 70 and the seat assembly 24 is in the back configuration shown in FIG. 8.

As used herein, substantially orthogonal means ninety degrees plus or minus twenty degrees. Orthogonal or substantially orthogonal do not require that the two axis' lie in the same plane. One axis may be orthogonal to another axis and lie in a different plane than the other axis as illustrated in FIG. 4 where axis 64 is positioned higher than (i.e., offset from) axis 60 relative to front seat base 34. Substantially parallel means parallel plus or minus twenty degrees.

The terms front and back or front and rear are used in this disclosure to illustrate the example application of the seat assembly 24 in a backhoe vehicle. Seat assembly 24 may be used in other vehicles that have operator areas or positions that are opposite to each other (e.g., on opposite sides of a vehicle).

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

What is claimed is:

1. A configurable seat assembly for a vehicle, the configurable seat assembly comprising:
    a first mount;
    a second mount;
    a first seat panel connected to a first bracket and a second bracket that are pivotably connected to the first mount and second mount, the first bracket and second bracket pivotable about a first axis between a first seat assembly configuration in which the first seat panel is positioned as a seat back and a second seat assembly configuration in which the first seat panel is positioned as a seat bottom; and
    a second seat panel pivotably connected to the first bracket, the second seat panel detachably connected to the second bracket, the second seat panel pivotable about a second axis that is at an angle relative to the first axis, the second seat panel pivotable between the first seat assembly configuration in which the second seat panel is positioned as a seat bottom and the second seat assembly configuration in which the seat panel is positioned as a seat back, wherein the second seat panel is pivotable about the second axis when the second seat panel is detached from the second bracket.

2. The configurable seat assembly of claim 1, wherein the second seat panel is connected to the second bracket in the first seat assembly configuration and the second seat assembly configuration.

3. The configurable seat assembly of claim 2, wherein the configurable seat assembly is in a transition configuration when the second seat panel is detached from the second bracket.

4. The configurable seat assembly of claim 1, further comprising:
    a first seat assembly support that is configured to detachably connect to the second seat panel, the first seat assembly support configured to support the second seat panel in the first seat assembly configuration; and
    a second seat assembly support that is configured to detachably connect to the first seat panel, the second seat assembly support configured to support the first seat panel in the second seat assembly configuration.

5. The configurable seat assembly of claim 4, wherein the first seat assembly support has a top portion including a tread pattern.

6. The configurable seat assembly of claim 1, wherein the first seat panel is detachably connected to the second bracket with a latching mechanism.

7. The configurable seat assembly of claim 1, wherein the angle is substantially orthogonal.

8. The configurable seat assembly of claim 7, wherein the second axis is offset from the first axis.

9. The configurable seat assembly of claim 1, wherein the angle is orthogonal.

10. The configurable seat assembly of claim 1, further comprising a front seat assembly support including a front latch receptor, wherein the second seat panel comprises a latching mechanism configured to detachably connect to the front latch receptor.

11. The configurable seat assembly of claim 10, further comprising a back seat assembly support including a back latch receptor, wherein the first seat panel comprises a latching mechanism configured to detachably connect to the back latch receptor.

12. The configurable seat assembly of claim 1, wherein the first seat assembly configuration is positioned for a loader operation of the vehicle and the second seat assembly configuration is positioned for a backhoe operation of the vehicle.

13. A vehicle comprising:
    a first work implement on a first side of the vehicle;
    a second work implement on a second side of the vehicle that is opposite to the first side;
    a first operator work area adjacent the first work implement;
    a second operator work area adjacent the second work implement; and
    a configurable seat assembly having a first seat assembly configuration in which the configurable seat assembly is positioned adjacent the first operator work area and a second seat assembly configuration in which the configurable seat assembly is positioned adjacent the second operator work area, the configurable seat assembly including
        a first bracket pivotably connected to a first mount, the first bracket configured to pivot about a first axis that is substantially orthogonal to a first line extending between the first side and the second side;
        a second bracket pivotably connected to a second mount, the second bracket configured to pivot about the first axis;
        a first seat panel connected to the first mount and second mount, the first seat panel pivotable between the first seat assembly configuration in which the first seat panel is positioned as a seat back and the second seat assembly configuration in which the first seat panel is positioned as a seat bottom; and a second seat panel detachably connected to the second bracket, the second seat panel pivotably connected to the first bracket about a second axis that is substantially parallel to the line extending between the first side and the second side, the second seat panel pivotable between the first seat assembly configuration in which the second seat panel is positioned as a seat bottom and the second seat assembly configuration in which the seat panel is positioned as a seat back, wherein the second seat panel is pivotable about the second axis when the second seat panel is detached from the second bracket.

14. The vehicle of claim 13, wherein the second seat panel is connected to the second bracket in the first seat assembly configuration and the second seat assembly configuration and wherein the configurable seat assembly is in a transition configuration when the second seat panel is detached from the second bracket.

15. The vehicle of claim 13, further comprising:
a first seat assembly support that is configured to detachably connect to the second seat panel, the first seat assembly support configured to support the second seat panel in the first seat assembly configuration; and
a second seat assembly support that is configured to detachably connect to the first seat panel, the second seat assembly support configured to support the first seat panel in the second seat assembly configuration.

16. The vehicle of claim 15, wherein the first seat assembly support has a top portion including a tread pattern.

17. The vehicle of claim 13, wherein the configurable seat assembly includes a first seat assembly support including a first latch receptor, wherein the second seat panel comprises a latching mechanism configured to detachably connect to the first latch receptor.

18. The vehicle of claim 17, further comprising a second seat assembly support including a second latch receptor, wherein the first seat panel comprises a latching mechanism configured to detachably connect to the second latch receptor.

* * * * *